（12） United States Patent
Taguchi et al.

(10) Patent No.: US 12,191,493 B2
(45) Date of Patent: *Jan. 7, 2025

(54) COMPOSITION FOR ELECTROCHEMICAL DEVICE FUNCTIONAL LAYER, FUNCTIONAL LAYER FOR ELECTROCHEMICAL DEVICE, AND ELECTROCHEMICAL DEVICE

(71) Applicant: ZEON CORPORATION, Tokyo (JP)

(72) Inventors: Hiroyuki Taguchi, Tokyo (JP); Keiichiro Tanaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 423 days.

This patent is subject to a terminal disclaimer.

(21) Appl. No.: 16/639,586

(22) PCT Filed: Aug. 24, 2018

(86) PCT No.: PCT/JP2018/031434
§ 371 (c)(1),
(2) Date: Feb. 17, 2020

(87) PCT Pub. No.: WO2019/044720
PCT Pub. Date: Mar. 7, 2019

(65) Prior Publication Data
US 2021/0028458 A1      Jan. 28, 2021

(30) Foreign Application Priority Data

Aug. 31, 2017   (JP) ................. 2017-167538

(51) Int. Cl.
| | |
|---|---|
| *H01M 4/00* | (2006.01) |
| *C08F 220/12* | (2006.01) |
| *C08F 220/44* | (2006.01) |
| *C08G 65/00* | (2006.01) |
| *C08K 3/22* | (2006.01) |
| *H01M 4/60* | (2006.01) |
| *H01M 10/0525* | (2010.01) |
| *H01M 50/411* | (2021.01) |
| *H01M 50/443* | (2021.01) |

(52) U.S. Cl.
CPC .......... *H01M 4/602* (2013.01); *C08F 220/12* (2013.01); *C08F 220/44* (2013.01); *C08G 65/00* (2013.01); *C08K 3/22* (2013.01); *H01M 10/0525* (2013.01); *H01M 50/411* (2021.01); *H01M 50/443* (2021.01); *C08K 2003/2227* (2013.01)

(58) Field of Classification Search
CPC ............ H01M 4/602; H01M 10/0525; H01M 50/411; H01M 4/622; H01M 50/414; H01M 50/443; H01M 4/62; H01M 4/66; H01M 50/446; H01M 50/449; C08F 220/12; C08F 220/44; C08F 212/08; C08F 220/286; C08G 65/00; C08K 3/22; C08K 2003/2227; C09D 133/14; Y02E 60/10; H01G 11/26; H01G 11/28; H01G 11/38; H01G 11/52; H01G 11/68; H01G 11/70

See application file for complete search history.

(56) References Cited

U.S. PATENT DOCUMENTS

| | | | | |
|---|---|---|---|---|
| 6,770,397 | B1 * | 8/2004 | Maeda ................. | H01M 4/622 429/231.95 |
| 8,628,881 | B2 * | 1/2014 | Okada ................. | H01M 4/366 429/231.1 |
| 9,065,150 | B2 | 6/2015 | Hashimoto et al. | |
| 10,691,037 | B2 * | 6/2020 | Niwa ..................... | C08L 71/03 |
| 10,797,343 | B2 * | 10/2020 | Maeda .............. | H01M 10/0562 |
| 11,721,798 | B2 * | 8/2023 | Tanaka ................. | H01M 4/623 429/217 |
| 2010/0221614 | A1 | 9/2010 | Bertin et al. | |
| 2013/0316219 | A1 | 11/2013 | Ha et al. | |
| 2014/0342225 | A1 * | 11/2014 | Isshiki ................. | H01M 4/366 429/217 |

(Continued)

FOREIGN PATENT DOCUMENTS

| | | |
|---|---|---|
| JP | 2003268053 A | 9/2003 |
| JP | 2005025963 A | 1/2005 |
| JP | 2009531820 A | 9/2009 |

(Continued)

OTHER PUBLICATIONS

Apr. 16, 2021, the Extended European Search Report issued by the European Patent Office in the corresponding European Patent Application No. 18851231.3.

(Continued)

*Primary Examiner* — Nicholas P D'Aniello
(74) *Attorney, Agent, or Firm* — KENJA IP LAW PC

(57) ABSTRACT

Provided is a composition for an electrochemical device functional layer capable of providing an electrochemical device having low volume expansion. The composition for an electrochemical device functional layer contains a solvent and a polymer including an oxide structure-containing monomer unit. The oxide structure-containing monomer unit has a structure indicated by the following formula (I) (in formula (I), $R^1$ represents an optionally substituted alkylene group and n is a positive integer), and the polymer has a number-average molecular weight of not less than 5,000 and not more than 15,000.

$$\mathrm{-\!\!\!+\!\!O\!-\!\!R^1\!\!+\!\!\!-}_n \quad (I)$$

7 Claims, No Drawings

(56) References Cited

U.S. PATENT DOCUMENTS

2016/0064773 A1* 3/2016 Choi ................ H01M 10/0565
    429/313

FOREIGN PATENT DOCUMENTS

| | | |
|---|---|---|
| JP | 2011142073 A | 7/2011 |
| JP | 2012051962 A | 3/2012 |
| JP | 2014042063 A | 3/2014 |
| JP | 5466374 B2 | 4/2014 |
| JP | 2014534570 A | 12/2014 |

OTHER PUBLICATIONS

Mar. 3, 2020, International Preliminary Report on Patentability issued in the International Patent Application No. PCT JP2018/031434.
Nov. 20, 2018, International Search Report issued in the International Patent Application No. PCT/JP2018/031434.
Sep. 19, 2024, Communication pursuant to Article 94(3) EPC issued by the European Patent Office in the corresponding European Patent Application No. 18851231.3.

* cited by examiner

COMPOSITION FOR ELECTROCHEMICAL DEVICE FUNCTIONAL LAYER, FUNCTIONAL LAYER FOR ELECTROCHEMICAL DEVICE, AND ELECTROCHEMICAL DEVICE

TECHNICAL FIELD

The present disclosure relates to a composition for an electrochemical device functional layer, a functional layer for an electrochemical device, and an electrochemical device.

BACKGROUND

Electrochemical devices such as lithium ion secondary batteries and electric double-layer capacitors have characteristics such as compact size, light weight, high energy-density, and the ability to be repeatedly charged and discharged, and are used in a wide variety of applications. An electrochemical device generally includes components such as a positive electrode, a negative electrode, and a separator that isolates the positive electrode and the negative electrode from one another and prevents short circuiting between the positive and negative electrodes.

There are cases in which a component that includes a functional layer containing a binder and optionally containing particles compounded so as to cause the component to display a desired function (hereinafter, referred to as "functional particles") is used as a component of an electrochemical device.

Specifically, a separator that includes an adhesive layer containing a binder on a separator substrate or a porous membrane layer containing a binder and non-conductive particles as functional particles on a separator substrate may be used as a separator of an electrochemical device. Moreover, an electrode that includes an electrode mixed material layer containing a binder and electrode active material particles as functional particles on a current collector or an electrode that further includes an adhesive layer or a porous membrane layer such as described above on an electrode substrate including an electrode mixed material layer on a current collector may be used as an electrode of an electrochemical device.

Much effort has been focused on improving functional layers in recent years with the aim of providing electrochemical devices with even higher performance (for example, refer to Patent Literature (PTL) 1).

Specifically, PTL 1 proposes that by using a negative electrode material that contains a binder that is soluble in aqueous solution and a polymer material that includes an ethylene oxide unit or a propylene oxide unit and that has a number-average molecular weight of 20,000 to 4,000,000, the negative electrode material can be bound to a current collector using a small amount of the binder, and a non-aqueous secondary battery having high capacity and excellent charge/discharge cycle characteristics can be provided.

CITATION LIST

Patent Literature

PTL 1: JP 2005-25963 A

SUMMARY

Technical Problem

However, a functional layer in which the conventional polymer material described above is used suffers from a problem that an increased amount of water is held in the functional layer, and gas evolves through a reaction between water and electrolyte solution, leading to volume expansion of an electrochemical device.

Accordingly, one objective of the present disclosure is to provide a composition for an electrochemical device functional layer capable of providing an electrochemical device having low volume expansion.

Another objective of the present disclosure is to provide a functional layer for an electrochemical device capable of providing an electrochemical device having low volume expansion, and also to provide an electrochemical device that includes this functional layer for an electrochemical device and has low volume expansion.

Solution to Problem

The inventors conducted diligent investigation with the aim of solving the problem set forth above. The inventors discovered that an electrochemical device having low volume expansion can be obtained by using a composition for an electrochemical device functional layer containing a solvent and a polymer that includes a specific oxide structure-containing monomer unit and that has a number-average molecular weight of not less than 5,000 and not more than 15,000.

Specifically, the present disclosure aims to advantageously solve the problem set forth above by disclosing a composition for an electrochemical device functional layer comprising: a polymer including an oxide structure-containing monomer unit; and a solvent, wherein the oxide structure-containing monomer unit has a structure indicated by a formula (I), shown below,

(I)

where, in the formula (I), $R^1$ represents an optionally substituted alkylene group and n is a positive integer, and the polymer has a number-average molecular weight of not less than 5,000 and not more than 15,000. Through use of a composition for an electrochemical device functional layer containing a solvent and a polymer that includes the specific oxide structure-containing monomer unit set forth above and that has a number-average molecular weight that is within the numerical range set forth above in this manner, it is possible to obtain an electrochemical device having low volume expansion.

Note that the number-average molecular weight of the polymer referred to in the present disclosure can be measured by a method described in the EXAMPLES section of the present specification.

In the presently disclosed composition for an electrochemical device functional layer, $R^1$ is preferably one selected from the group consisting of an ethylene group, a propylene group, and a phenylethylene group. When $R^1$ is one selected from the group consisting of an ethylene group, a propylene group, and a phenylethylene group, volume expansion of an electrochemical device can be further inhibited, and peel strength of a functional layer for an electrochemical device can be increased.

In the presently disclosed composition for an electrochemical device functional layer, n is preferably an integer of not less than 2 and not more than 30. When n is an integer of not less than 2 and not more than 30, volume expansion of an electrochemical device can be further inhibited, and peel strength of a functional layer for an electrochemical device can be increased.

Note that the value of n referred to in the present disclosure can be determined through measurement by nuclear magnetic resonance (NMR).

In the presently disclosed composition for an electrochemical device functional layer, the polymer preferably includes the oxide structure-containing monomer unit in a proportion of not less than 20 mol % and not more than 80 mol %. When the polymer includes the oxide structure-containing monomer unit within the numerical range set forth above, volume expansion of an electrochemical device can be further inhibited, and peel strength of a functional layer for an electrochemical device can be increased. Moreover, low-temperature output characteristics of an electrochemical device can be improved.

Herein, the proportion in which the polymer includes the oxide structure-containing monomer unit can be measured by nuclear magnetic resonance (NMR).

In the presently disclosed composition for an electrochemical device functional layer, the polymer is preferably a copolymer. When the polymer is a copolymer in this manner, a functional layer for an electrochemical device can be provided with a variety of functions originating from two or more monomers.

The presently disclosed composition for an electrochemical device functional layer preferably further comprises non-conductive particles. When the composition for an electrochemical device functional layer further contains non-conductive particles in this manner, a functional layer for an electrochemical device can be provided with a variety of functions originating from these non-conductive particles, which enables good improvement of electrical characteristics of an electrochemical device.

Note that in the presently disclosed composition for an electrochemical device functional layer, the non-conductive particles preferably include either or both of inorganic particles and organic particles.

The present disclosure also aims to advantageously solve the problem set forth above by disclosing a functional layer for an electrochemical device formed using the composition for an electrochemical device functional layer set forth above. This functional layer is capable of providing an electrochemical device having low volume expansion.

The present disclosure also aims to advantageously solve the problem set forth above by disclosing an electrochemical device comprising the functional layer for an electrochemical device set forth above. This electrochemical device has low volume expansion and high performance.

Advantageous Effect

Through the presently disclosed composition for an electrochemical device functional layer, it is possible to provide an electrochemical device having low volume expansion.

Moreover, according to the present disclosure, it is possible to provide a functional layer for an electrochemical device that is capable of providing an electrochemical device having low volume expansion, and also to provide an electrochemical device that includes this functional layer for an electrochemical device and has low volume expansion.

DETAILED DESCRIPTION

The following provides a detailed description of embodiments of the present disclosure.

The presently disclosed composition for an electrochemical device functional layer can be used to form any functional layer (for example, an electrode mixed material layer, a porous membrane layer, or an adhesive layer) that has a function such as reinforcement, adhesion, or giving and receiving electrons in an electrochemical device. Moreover, the presently disclosed functional layer for an electrochemical device is formed from the presently disclosed composition for an electrochemical device functional layer. Furthermore, the presently disclosed electrochemical device includes the presently disclosed functional layer for an electrochemical device.

(Composition for Electrochemical Device Functional Layer)

The presently disclosed composition for an electrochemical device functional layer is a slurry composition that contains a solvent and a polymer including an oxide structure-containing monomer unit and that optionally further contains one or more selected from the group consisting of a binder, non-conductive particles, electrode active material particles, and other components (additives, etc.) that can be contained in functional layers.

The presently disclosed composition for an electrochemical device functional layer can be used to provide an electrochemical device having low volume expansion.

<Polymer Including Oxide Structure-Containing Monomer Unit>

The polymer including the oxide structure-containing monomer unit (hereinafter, also referred to simply as "the polymer") includes at least an oxide structure-containing monomer unit and may optionally include other monomer units.

As used in the present disclosure, the phrase "includes a monomer unit" means that "a polymer obtained with the monomer includes a structural unit derived from the monomer".

The following describes, in detail, the polymer including an oxide structure-containing monomer unit that is used in the presently disclosed composition for an electrochemical device functional layer.

[Oxide Structure-Containing Monomer Unit]

The oxide structure-containing monomer unit has a structure indicated by the following formula (I).

(In formula (I), $R^1$ represents an optionally substituted alkylene group and n is a positive integer.)

The alkylene group is not specifically limited and may be, for example, a linear or branched alkylene group having a carbon number of 1 to 10 such as a methylene group, an ethylene group, a propylene group, a butylene group, a pentylene group, a hexylene group, a heptylene group, an octylene group, a nonylene group, or a decanylene group. Of these examples, an ethylene group or a propylene group is preferable as the alkylene group.

Examples of possible substituents include, but are not specifically limited to, substituents other than alkyl groups, specific examples of which include a hydroxy group; a cyano group; an amino group; a substituted amino group such as a dimethylamino group; an alkoxy group having a carbon number of 1 to 10 such as a methoxy group, an ethoxy group, or a propoxy group; a nitro group; a cycloalkyl group having a carbon number of 3 to 10 such as a cyclopropyl group or a cyclohexyl group; and an aryl group such as a phenyl group or a naphthyl group. Of these examples, a phenyl group is preferable as an optional substituent.

$R^1$ in formula (I) may be, but is not specifically limited to, a linear or branched alkylene group having a carbon number of 1 to 10 that optionally includes a substituent such as described above. Moreover, in formula (I) is preferably one selected from the group consisting of an ethylene group, a propylene group, and a phenylethylene group, and is more preferably an ethylene group. When $R^1$ is one selected from the group consisting of an ethylene group, a propylene group, and a phenylethylene group, volume expansion of an electrochemical device can be further inhibited, and peel strength of a functional layer for an electrochemical device can be increased. Moreover, when $R^1$ is an ethylene group, low-temperature output characteristics of an electrochemical device can be enhanced.

In formula (I), n is preferably 2 or more, more preferably 3 or more, even more preferably 4 or more, and further preferably 13 or more, and is preferably 30 or less, more preferably 23 or less, even more preferably 20 or less, and further preferably 15 or less. When n is 2 or more, high peel strength of a functional layer for an electrochemical device can be maintained because elution of the polymer into electrolyte solution is inhibited. On the other hand, when n is 30 or less, water absorption by a functional layer for an electrochemical device can be reduced, evolution of gas through a reaction between electrolyte solution and water can be inhibited, and volume expansion of an electrochemical device can be further inhibited.

Note that in a case in which n in formula (I) is 2 or more, the plurality of $R^1$ groups (n-number of $R^1$ groups) included in the oxide structure-containing monomer unit may all have the same structure or at least some thereof may have a different structure.

Examples of monomers that can form the oxide structure-containing monomer unit set forth above include, but are not specifically limited to, linear and branched alkylene oxides having a carbon number of 1 to 10 such as ethylene oxide, propylene oxide, butylene oxide, pentylene oxide, hexylene oxide, heptylene oxide, octylene oxide, nonylene oxide, and decanylene oxide, and derivatives of these alkylene oxides. The derivative may be an alkylene oxide that includes a substituent. This substituent may be the same as any of the substituents that can be included by the alkylene group of $R^1$.

Examples of monomers that can form the oxide structure-containing monomer unit set forth above also include monomers indicated by the following formula (II).

(II)

(In formula (II), $R^1$ is as previously described, one of X and Y represents a (meth)acryloyl group, the other of X and Y represents a hydrogen atom, a (meth)acryloyl group, or a substituent other than a (meth)acryloyl group, and n is a positive integer.)

In formula (II), n is preferably 2 or more, more preferably 3 or more, even more preferably 4 or more, and further preferably 13 or more, and is preferably 30 or less, more preferably 23 or less, even more preferably 20 or less, and further preferably 15 or less in the same way as n in the previously described formula (I).

In a case in which one of X and Y in formula (II) is a substituent other than a (meth)acryloyl group, this substituent may be, for example, a linear or branched alkyl group having a carbon number of 1 to 10 such as a methyl group, an ethyl group, a propyl group, a butyl group, or a pentyl group, but is not specifically limited thereto.

Note that in the present disclosure, "(meth)acryloyl group" is used to indicate "acryloyl group" and/or "methacryloyl group".

Specific examples of monomers indicated by formula (II) include polyethylene glycol mono(meth)acrylate, polypropylene glycol mono(meth)acrylate, polystyrene glycol mono(meth)acrylate, methoxy polyethylene glycol (meth)acrylate, methoxy polypropylene glycol (meth)acrylate, methoxy polystyrene glycol (meth)acrylate, ethoxy polyethylene glycol (meth)acrylate, ethoxy polypropylene glycol (meth)acrylate, ethoxy polystyrene glycol (meth)acrylate, polyethylene glycol di(meth)acrylate, polypropylene glycol di(meth)acrylate, and polystyrene glycol di(meth)acrylate.

Note that in the present disclosure, "(meth)acrylate" is used to indicate "acrylate" and/or "methacrylate".

The proportion in which the polymer includes the oxide structure-containing monomer unit is not specifically limited and may be 100 mol %, but is preferably 20 mol % or more, more preferably 25 mol % or more, and even more preferably 30 mol % or more, and is preferably 80 mol % or less. When the proportion in which the polymer includes the oxide structure-containing monomer unit is 20 mol % or more, high peel strength of a functional layer for an electrochemical device can be maintained because elution of the polymer into electrolyte solution is inhibited. Moreover, low-temperature output characteristics of an electrochemical device can be improved. On the other hand, when the proportion in which the polymer includes the oxide structure-containing monomer unit is 80 mol % or less, water absorption by a functional layer for an electrochemical device can be reduced, evolution of gas through a reaction between electrolyte solution and water can be inhibited, and volume expansion of an electrochemical device can be further inhibited.

[Other Monomer Units]

The polymer may include monomer units other than the oxide structure-containing monomer unit set forth above. No specific limitations are placed on monomers that can form such other monomer units other than being monomers that do not include an oxide structure. Examples of such monomers include (meth)acrylic acid alkyl ester monomers, (meth)acrylonitrile, and acidic group-containing monomers.

Note that in the present disclosure, "(meth)acryl" is used to indicate "acryl" and/or "methacryl", and "(meth)acrylonitrile" is used to indicate "acrylonitrile" and/or "methacrylonitrile".

Examples of (meth)acrylic acid alkyl ester monomers include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate (for example, 2-ethylhexyl acrylate), nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate (for example, 2-ethylhexyl methacrylate), nonyl methacrylate, decyl methacrylate, lauryl methacrylate, n-tetradecyl methacrylate, and stearyl methacrylate.

Examples of acidic group-containing monomers include carboxy group-containing monomers, sulfo group-containing monomers, and phosphate group-containing monomers.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxy group upon hydrolysis can be used as a carboxy group-containing monomer.

Examples of sulfo group-containing monomers include styrene sulfonic acid, vinyl sulfonic acid, methyl vinyl sulfonic acid, (meth)allyl sulfonic acid, and 3-allyloxy-2-hydroxypropane sulfonie acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

[Production of Polymer]

The polymer is produced through polymerization of a composition containing an oxide structure-containing monomer such as previously described and other optional monomers.

The proportion in which each monomer is included in the monomer composition is normally the same as the proportion in which each monomer unit is included in the target polymer.

No specific limitations are placed on the method of polymerization of the polymer. For example, any of solution polymerization, suspension polymerization, bulk polymerization, and emulsion polymerization may be used. The polymerization reaction may be, for example, addition polymerization such as ionic polymerization, radical polymerization, or living radical polymerization. Commonly used emulsifiers, dispersants, polymerization initiators, polymerization aids, and the like may be used in the polymerization in an amount that is also the same as commonly used.

[Properties of Polymer]

The number-average molecular weight of the polymer is required to be 5,000 or more, and is preferably 5,500 or more, more preferably 6,000 or more, and even more preferably 6,200 or more. Moreover, the number-average molecular weight of the polymer is required to be 15,000 or less, and is preferably 14,000 or less, more preferably 12,000 or less, and even more preferably 10,800 or less. When the number-average molecular weight of the polymer is 5,000 or more, high peel strength of a functional layer for an electrochemical device can be maintained because elution of the polymer into electrolyte solution is inhibited. On the other hand, when the number-average molecular weight of the polymer is 15,000 or less, water absorption by a functional layer for an electrochemical device can be reduced, evolution of gas through a reaction between electrolyte solution and water can be inhibited, and volume expansion of an electrochemical device can be further inhibited.

The polymer may be a homopolymer such as polyethylene glycol, polypropylene glycol, or polystyrene glycol, or may be a copolymer, but is preferably a copolymer. In a case in which the polymer is a copolymer, a functional layer for an electrochemical device can be provided with a variety of functions originating from two or more monomers.

Also note that the polymer is normally water-soluble. Herein, water-soluble means that when 0.5 g of a polymer is dissolved in 100 g of water at a temperature of 50° C., insoluble content is less than 10.0 mass %.

[Additive Amount of Polymer]

Although no specific limitations are placed on the additive amount of the polymer in the presently disclosed composition for an electrochemical device functional layer, the amount per 100 parts by mass of the subsequently described non-conductive particles is preferably 1 part by mass or more, more preferably 3 parts by mass or more, and even more preferably 5 parts by mass or more, and is preferably 90 parts by mass or less, more preferably 80 parts by mass or less, and even more preferably 50 parts by mass or less. When the additive amount of the polymer is 1 part by mass or more per 100 parts by mass of the non-conductive particles, high peel strength of a functional layer for an electrochemical device can be maintained. On the other hand, when the additive amount of the polymer is 90 parts by mass or less, water absorption by a functional layer for an electrochemical device can be reduced, evolution of gas through a reaction between electrolyte solution and water can be inhibited, and volume expansion of an electrochemical device can be further inhibited.

<Binder>

The binder can function as a component that binds components such as the non-conductive particles in a functional layer for an electrochemical device formed using the presently disclosed composition for an electrochemical device functional layer.

Known binders can be used as a binder in the presently disclosed composition for an electrochemical device functional layer. However, note that the binder is a different component to the previously described polymer and organic particles used as the subsequently described non-conductive particles.

The binder may, for example, be a fluoropolymer (polymer including mainly a fluorine-containing monomer unit) such as polyvinylidene fluoride (PVdF); an aliphatic conjugated diene/aromatic vinyl copolymer (polymer including mainly an aliphatic conjugated diene monomer unit and an aromatic vinyl monomer unit) such as a styrene-butadiene copolymer (SBR) or a hydrogenated product thereof; an aliphatic conjugated diene/acrylonitrile copolymer such as a butadiene-acrylonitrile copolymer (NBR) or a hydrogenated product thereof; a polyvinyl alcohol polymer such as polyvinyl alcohol (PVA); or the like depending on the location where a functional layer is to be provided.

Examples of various monomers that can form the various monomer units include known examples of such monomers. Note that the phrase "including mainly" used with respect to one type of monomer unit or two or more types of monomer units in the present disclosure means that "when the amount of all monomer units included in a polymer is taken to be 100 mass %, the proportion in which the one type of monomer unit is included or the total proportion in which the two or more types of monomer units are included is more than 50 mass %".

[Production of Binder]

The method by which the binder is produced is not specifically limited and may, for example, be a method in which a monomer composition containing monomers that can form the various monomer units is polymerized to produce the binder. No specific limitations are placed on the method of polymerization. For example, any of solution polymerization, suspension polymerization, bulk polymerization, and emulsion polymerization may be used. The polymerization reaction may be, for example, addition polymerization such as ionic polymerization, radical polymerization, or living radical polymerization. Commonly used emulsifiers, dispersants, polymerization initiators, polymerization aids, and the like may be used in the polymerization in an amount that is also the same as commonly used.

[Properties of Binder]

Although no specific limitations are placed on the properties of the binder, the glass-transition temperature of the binder is preferably −75° C. or higher, more preferably −55° C. or higher, and even more preferably −35° C. or higher, and is preferably 5° C. or lower, and more preferably 0° C. or lower. When the glass-transition temperature of the binder is within any of the numerical ranges set forth above, characteristics such as flexibility, windability, and binding capacity of a functional layer formed using the presently disclosed composition for an electrochemical device functional layer can be suitably maintained.

The glass-transition temperature of the binder can be measured by a measurement method described in the EXAMPLES section of the present specification.

In a case in which the binder is in a particulate form, the volume-average particle diameter D50 of the binder is preferably 0.1 μm or more, and is preferably 0.5 μm or less, more preferably 0.45 μm or less, and even more preferably 0.4 μm or less from a viewpoint of dispersibility of the binder.

The volume-average particle diameter D50 of the binder can be measured by a measurement method described in the EXAMPLES section of the present specification.

Also note that the binder is normally water-insoluble. Herein, water-insoluble means that when 0.5 g of a polymer is dissolved in 100 g of water at a temperature of 50° C., insoluble content is 50.0 mass % or more.

[Additive Amount of Binder]

Although no specific limitations are placed on the additive amount of the binder in the presently disclosed composition for an electrochemical device functional layer, the amount per 100 parts by mass of the non-conductive particles is preferably 0.1 parts by mass or more, more preferably 0.2 parts by mass or more, and even more preferably 0.5 parts by mass or more, and is preferably 20 parts by mass or less, more preferably 15 parts by mass or less, and even more preferably 10 parts by mass or less.

<Non-Conductive Particles>

Any known non-conductive particles that are used in electrochemical devices can be used as non-conductive particles without any specific limitations.

The additive amount of the non-conductive particles, in terms of solid content in the composition for an electrochemical device functional layer, is preferably 10 mass % or more, more preferably 20 mass % or more, and even more preferably 50 mass % or more, and is preferably 99 mass % or less, more preferably 97 mass % or less, and even more preferably 95 mass % or less. When the composition for an electrochemical device functional layer contains non-conductive particles, a functional layer for an electrochemical device can be provided with a variety of functions originating from these non-conductive particles, which enables good improvement of electrical characteristics of an electrochemical device.

Either or both of inorganic particles and organic particles can be used as non-conductive particles, with the use of both inorganic particles and organic particles being preferable.

The following describes, in detail, inorganic particles and organic particles used as non-conductive particles.

[Inorganic Particles]

Examples of inorganic particles that can be used include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. Of these inorganic particles, alumina, boehmite, titanium oxide, and barium sulfate are preferable. One of these types of inorganic particles may be used individually, or two or more of these types of inorganic particles may be used in combination.

The inclusion of inorganic particles as non-conductive particles in the composition for an electrochemical device functional layer enables improvement of strength and heat resistance of a functional layer for an electrochemical device.

Physical Properties of Inorganic Particles

Although no specific limitations are placed on the physical properties of the inorganic particles, the volume-average particle diameter D50 of the inorganic particles is preferably 0.1 μm or more, more preferably 0.2 μm or more, and even more preferably 0.3 μm or more, and is preferably 1 μm or less, more preferably 0.9 μm or less, and even more preferably 0.8 μm or less. When the volume-average particle diameter D50 of the inorganic particles is 0.1 μm or more, reduction of ion conductivity of a functional layer can be inhibited, and electrical characteristics (particularly output characteristics) of an electrochemical device can be improved. On the other hand, when the volume-average particle diameter D50 of the inorganic particles is 1 μm or less, a functional layer can be caused to display good adhesive function. Moreover, an electrochemical device can be provided with a higher capacity when inorganic particles having a volume-average particle diameter D50 of 1 μm or less are used because a functional layer that displays excellent protective function can be obtained even when the thickness of the functional layer is reduced.

The volume-average particle diameter D50 of the inorganic particles can be measured by a measurement method described in the EXAMPLES section of the present specification.

Additive Amount of Inorganic Particles

Although no specific limitations are placed on the additive amount of the inorganic particles, the amount thereof is preferably not less than 80 parts by mass and not more than 99 parts by mass per 100 parts by mass of the total additive amount of non-conductive particles.

[Organic Particles]

The organic particles are not specifically limited so long as they differ from the previously described polymer and binder, and may, for example, be a fluoropolymer (polymer including mainly a fluorine-containing monomer unit) such as a polyvinylidene fluoride-hexafluoropropylene (PVdF-HFP) copolymer; or an acrylic polymer (polymer including mainly a (meth)acrylic acid alkyl ester monomer unit). The use of an acrylic polymer is preferable from a viewpoint of electrochemical stability. Examples of various monomers that can form the various monomer units include known examples of such monomers in the same way as for the previously described binder.

Through inclusion of organic particles as non-conductive particles in the composition for an electrochemical device functional layer, a functional layer for an electrochemical device can be caused to display excellent adhesiveness in electrolyte solution, and electrical characteristics of an electrochemical device including the functional layer can favorably be improved.

Herein, it is preferable that a particulate polymer having a core-shell structure is used as the organic particles. The term "core-shell structure" refers to a structure including a core portion and a shell portion formed by polymers that differ from one another in terms of chemical composition and/or properties. Although no specific limitations are placed on the particulate polymer having a core-shell structure, the particulate polymer may, for example, have a core-shell structure in which the core portion is a polymer formed through polymerization of an aromatic monovinyl monomer such as styrene; a (meth)acrylonitrile monomer such as (meth)acrylonitrile; a (meth)acrylic acid alkyl ester monomer such as methyl (meth)acrylate, ethyl (meth)acrylate, butyl (meth)acrylate, or 2-ethylhexyl (meth)acrylate; an acid group-containing monomer such as (meth)acrylic acid; and a cross-linkable monomer such as a di(meth)acrylic acid ester compound (for example, ethylene dimethacrylate, diethylene glycol dimethacrylate, ethylene glycol dimethacrylate, diethylene glycol diacrylate, or 1,3-butylene glycol diacrylate), and in which the shell portion is a polymer formed through polymerization of an aromatic monovinyl monomer such as styrene or a styrene derivative (for example, styrene sulfonic acid); and an acid group-containing monomer such as (meth)acrylic acid.

In the particulate polymer having a core-shell structure, the shell portion preferably partially covers the outer surface of the core portion. In other words, it is preferable that the shell portion of the organic particles covers the outer surface of the core portion but does not cover the entire outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Accordingly, an organic particle that, for example, includes a shell portion having fine pores that pass from the outer surface of the shell portion (i.e., a circumferential surface of the organic particle) to the outer surface of the core portion is also considered to be within the scope of the particulate polymer having the core-shell structure described above.

Production of Organic Particles

The organic particles can be produced through polymerization of a monomer composition containing the monomers described above, carried out in an aqueous solvent such as water, for example. In the polymerization, the proportion in which each monomer is included in the monomer composition can be set in accordance with the proportion in which each repeating unit (monomer unit) is included in the organic particles.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction. In the polymerization, seed particles may be used to perform seeded polymerization. The polymerization conditions can be adjusted as appropriate depending on the polymerization method and so forth.

Moreover, additives such as emulsifiers, polymerization initiators, polymerization aids, dispersion stabilizers, and co-stabilizers can be used in the polymerization.

Examples of emulsifiers, polymerization initiators, and polymerization aids that can be used include typically used emulsifiers, polymerization initiators, and polymerization aids, and the amount thereof may also be the same as typically used.

In a case in which the organic particles are a particulate polymer having the previously described core-shell structure, the organic particles can be produced, for example, by stepwise polymerization in which one or more monomers for the polymer of the core portion and one or more monomers for the polymer of the shell portion are used and in which the ratio of these monomers is changed over time. Specifically, the particulate polymer can be produced by continuous, multi-step emulsion polymerization or multi-step suspension polymerization in which a polymer of a preceding step is then covered by a polymer of a succeeding step.

Physical Properties of Organic Particles

Although no specific limitations are placed on the physical properties of the organic particles, the volume-average particle diameter D50 of the organic particles is preferably 0.1 μm or more, more preferably 0.12 μm or more, and even more preferably 0.15 μm or more, and is preferably 1 μm or less, more preferably 0.9 μm or less, and even more preferably 0.8 μm or less. When the volume-average particle diameter D50 of the organic particles is 0.1 μm or more, low-temperature output characteristics of an electrochemical device can be improved because an increase of internal resistance of a functional layer for an electrochemical device is suppressed. On the other hand, when the volume-average particle diameter D50 of the organic particles is 1 μm or less, high-temperature cycle characteristics of an electrochemical device can be improved because adhesiveness of the organic particles in electrolyte solution increases.

The volume-average particle diameter D50 of the organic particles can be measured by a measurement method described in the EXAMPLES section of the present specification.

The degree of swelling in electrolyte solution of the organic particles is preferably a factor of 1 or more, more preferably a factor of 1.2 or more, and even more preferably a factor of 1.5 or more, and is preferably a factor of 16 or less, more preferably a factor of 10 or less, and even more preferably a factor of 5 or less. When the degree of swelling in electrolyte solution of the organic particles is within any of the numerical ranges set forth above, electrical characteristics of an electrochemical device including a functional layer for an electrochemical device can favorably be improved because the functional layer displays excellent adhesiveness in electrolyte solution.

The degree of swelling in electrolyte solution of the organic particles can be measured by a measurement method described in the EXAMPLES section of the present specification.

The glass-transition temperature of the organic particles is preferably 10° C. or higher, more preferably 20° C. or higher, and even more preferably 30° C. or higher, and is preferably 110° C. or lower, more preferably 90° C. or lower, and even more preferably 80° C. or lower. When the glass-transition temperature of the organic particles is within any of the numerical ranges set forth above, electrical characteristics of an electrochemical device including a functional layer for an electrochemical device can favorably be improved because the functional layer displays excellent adhesiveness in electrolyte solution.

Also note that the organic particles are normally water-insoluble. Herein, water-insoluble means that when 0.5 g of a polymer is dissolved in 100 g of water at a temperature of 50° C., insoluble content is 50.0 mass % or more.

Additive Amount of Organic Particles

Although no specific limitations are placed on the additive amount of the organic particles, the amount thereof is preferably not less than 1 part by mass and not more than 20 parts by mass per 100 parts by mass of the total additive amount of non-conductive particles.

The proportion constituted by the organic particles among added non-conductive particles is not specifically limited but is preferably 5 volume % or more, and is preferably 50 volume % or less. When the proportion constituted by the organic particles is 5 volume % or more, high process adhesiveness of a functional layer for an electrochemical device can be maintained. On the other hand, when the proportion constituted by the organic particles is 50 volume % or less, good low-temperature output characteristics of an electrochemical device can be maintained.

<Electrode Active Material Particles>

In a case in which a functional layer formed using the presently disclosed composition for an electrochemical device functional layer is to be used as an electrode mixed material layer, the composition for an electrochemical device functional layer may contain electrode active material particles.

These electrode active material particles may, for example, be particles formed from any of the electrode active materials disclosed in JP 2014-42063 A.

<Additives>

Besides the components described above, the presently disclosed composition for an electrochemical device functional layer may contain any other components. Commonly known examples of such other components can be used without any specific limitations so long as battery reactions are not affected. Moreover, one of such other components may be used individually, or two or more of such other components may be used in combination.

Examples of these other components include known additives such as dispersants, thickeners, and wetting agents.

<Solvent>

Known solvents such as water, N-methylpyrrolidone (NMP), and acetone can be adopted as the solvent used in the presently disclosed composition for an electrochemical device functional layer without any specific limitations other than that the previously described polymer, binder, non-conductive particles, electrode active material particles, and additives can be dissolved or dispersed therein.

Also note that one of these solvents may be used individually, or two or more of these solvents may be used as a mixture.

<Production of Composition for Electrochemical Device Functional Layer>

No specific limitations are placed on the method by which the presently disclosed composition for an electrochemical device functional layer is produced.

In a case in which a functional layer formed using the composition for an electrochemical device functional layer is to be used as an electrode mixed material layer, for example, the composition for an electrochemical device functional layer may be produced by mixing the previously described polymer, electrode active material particles, a binder that is used as necessary, and other components in the presence of a solvent.

Moreover, in a case in which a functional layer formed using the composition for an electrochemical device functional layer is to be used as a porous membrane layer, for example, the composition for an electrochemical device functional layer may be produced by mixing the previously described polymer, non-conductive particles, a binder that is used as necessary, and other components in the presence of a solvent.

Furthermore, in a case in which a functional layer formed using the composition for an electrochemical device functional layer is to be used as an adhesive layer, for example, the previously described polymer and a binder that is used as necessary may be diluted with a solvent and then used as the composition for an electrochemical device functional layer, or the composition for an electrochemical device functional layer may be produced by mixing the previously described polymer, a binder that is used as necessary, and other components in the presence of a solvent.

Also note that no specific limitations are placed on the mixing method, and mixing may be performed using a typically used stirrer or disperser.

(Functional Layer for Electrochemical Device)

The presently disclosed functional layer for an electrochemical device is a layer having a function such as reinforcement, adhesion, or giving and receiving electrons inside a non-aqueous secondary battery. The functional layer may, for example, be an electrode mixed material layer in which electrons are given and received through electrochemical reactions, a porous membrane layer that improves heat resistance and strength, or an adhesive layer that improves adhesiveness.

Moreover, the presently disclosed functional layer for an electrochemical device is a layer that is formed from the presently disclosed composition for an electrochemical device functional layer set forth above, and can be formed by, for example, applying the composition for an electrochemical device functional layer set forth above onto the surface of a suitable substrate to form a coating film, and then drying the coating film.

The presently disclosed functional layer for an electrochemical device can be used to provide an electrochemical device having low volume expansion.

<Substrate>

No limitations are placed on the substrate onto which the composition for an electrochemical device functional layer is applied. For example, a coating film of the composition for an electrochemical device functional layer may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a component of an electrochemical device.

However, it is preferable that a current collector, a separator substrate, or an electrode substrate is used as the substrate from a viewpoint of raising component production efficiency since a step of peeling the functional layer can be omitted. More specifically, the composition for an electrochemical device functional layer is preferably applied onto a current collector serving as a substrate in a case in which an electrode mixed material layer is to be produced. Moreover, the composition for an electrochemical device functional layer is preferably applied onto a separator substrate or an electrode (negative electrode or positive electrode) substrate, is more preferably applied onto a separator substrate or a negative electrode substrate, and is even more preferably applied onto a separator substrate in a case in which a porous membrane layer or an adhesive layer is to be produced.

[Current Collector]

The current collector is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

[Separator Substrate]

A known separator substrate such as an organic separator substrate can be used as the separator substrate without any specific limitations. The organic separator substrate is a porous member that is made from an organic material. For example, the organic separator substrate may be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof.

[Electrode Substrate]

The electrode substrate (positive electrode substrate or negative electrode substrate) is not specifically limited and may be an electrode substrate obtained by forming an electrode mixed material layer containing electrode active material particles and a binder on a current collector such as previously described.

No specific limitations are placed on the electrode active material particles and the binder contained in the electrode mixed material layer of the electrode substrate, and the electrode active material particles and binder that were previously described in the "Composition for electrochemical device functional layer" section may be used. Also note that the presently disclosed functional layer for an electrochemical device may be used as the electrode mixed material layer of the electrode substrate.

<Formation Method of Functional Layer for Electrochemical Device>

Examples of methods by which the functional layer for an electrochemical device may be formed on a substrate such as the current collector, separator substrate, or electrode substrate described above include:

(1) a method in which the presently disclosed composition for an electrochemical device functional layer is applied onto the surface of the substrate (surface at an electrode mixed material layer side in the case of an electrode substrate; same applies below) and is then dried;

(2) a method in which the substrate is immersed in the presently disclosed composition for an electrochemical device functional layer and is then dried; and (3) a method in which the presently disclosed composition for an electrochemical device functional layer is applied onto a releasable substrate and is dried to produce a functional layer that is then transferred onto the surface of the substrate.

Of these methods, method (1) is particularly preferable since it allows simple control of the thickness of the functional layer. In more detail, method (1) includes a step of applying the composition for an electrochemical device functional layer onto a substrate (application step) and a step of drying the composition for an electrochemical device functional layer that has been applied onto the substrate to form a functional layer (drying step).

[Application Step]

Examples of methods by which the composition for an electrochemical device functional layer can be applied onto the substrate in the application step include, but are not specifically limited to, doctor blading, reverse roll coating, direct roll coating, gravure coating, extrusion coating, and brush coating.

[Drying Step]

The method by which the composition for an electrochemical device functional layer on the substrate is dried in the drying step is not specifically limited and may be a commonly known method. Examples of drying methods that can be used include drying by warm, hot, or low-humidity air; drying in a vacuum; and drying by irradiation with infrared light, electron beams, or the like.

<Properties of Functional Layer>

Although no specific limitations are placed on the properties of the functional layer for an electrochemical device formed by the method described above, the thickness of the functional layer is preferably 0.1 µm or more, more preferably 0.3 µm or more, and even more preferably 0.5 µm or more, and is preferably 10 µm or less, more preferably 7 µm or less, and even more preferably 5 µm or less. A functional layer thickness of 0.1 µm or more can ensure that the functional layer has sufficient strength. On the other hand, a functional layer thickness of 10 µm or less can improve low-temperature output characteristics of an electrochemical device by maintaining good ion diffusivity in the functional layer.

(Component for Electrochemical Device Including Functional Layer for Electrochemical Device)

A component (separator or electrode) for an electrochemical device that includes the presently disclosed functional layer for an electrochemical device may also include constituent elements other than the presently disclosed functional layer set forth above and a substrate so long as the effects disclosed herein are not significantly lost. Examples of such other constituent elements include, but are not specifically limited to, any electrode mixed material layer, porous membrane layer, or adhesive layer that does not correspond to the presently disclosed functional layer for an electrochemical device.

Moreover, the component may include more than one type of the presently disclosed functional layer for an electrochemical device. For example, an electrode may include an electrode mixed material layer formed from the presently disclosed composition for an electrochemical device functional layer on a current collector and may also include a porous membrane layer and/or adhesive layer formed from the presently disclosed composition for an electrochemical device functional layer on the electrode mixed material layer. Moreover, a separator may, for example, include a porous membrane layer formed from the presently disclosed composition for an electrochemical device functional layer on a separator substrate and may also include an adhesive layer formed from the presently disclosed composition for an electrochemical device functional layer on the porous membrane layer.

(Electrochemical Device)

The presently disclosed electrochemical device may be, but is not specifically limited to, a lithium ion secondary battery or an electric double-layer capacitor, and is preferably a lithium ion secondary battery.

Moreover, a feature of the presently disclosed electrochemical device is that it includes the presently disclosed functional layer for an electrochemical device set forth above.

Although the following describes, as one example, a case in which the electrochemical device is a lithium ion secondary battery, the presently disclosed electrochemical device is not limited to the following example.

A lithium ion secondary battery that is one example of the presently disclosed electrochemical device includes a positive electrode, a negative electrode, a separator, and an electrolyte solution, wherein at least one of the positive electrode, the negative electrode, and the separator includes the presently disclosed functional layer for an electrochemical device set forth above. The lithium ion secondary battery corresponding to the presently disclosed electrochemical device has low volume expansion and high performance.

<Positive Electrode, Negative Electrode, and Separator>

At least one of the positive electrode, the negative electrode, and the separator used in the lithium ion secondary battery corresponding to the presently disclosed electrochemical device is a battery component that includes the presently disclosed functional layer for an electrochemical device set forth above. Note that a known positive electrode, negative electrode, or separator may be used without any specific limitations as a positive electrode, negative electrode, or separator that does not include the presently disclosed functional layer for an electrochemical device.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Suitable examples include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Lithium Ion Secondary Battery>

The lithium ion secondary battery corresponding to the presently disclosed electrochemical device can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. At least one battery component among the positive electrode, the negative electrode, and the separator is a battery component that includes the presently disclosed functional layer for an electrochemical device. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to these examples. In the following description, "%" and "parts" used in expressing quantities are by mass, unless otherwise specified.

In the examples and comparative examples, the following methods were used to evaluate the proportion in which an oxide structure-containing monomer unit is included in a polymer, the number-average molecular weight of a polymer, the glass-transition temperature of a binder and organic particles, the volume-average particle diameter D50 of a binder and non-conductive particles, the degree of swelling in electrolyte solution of organic particles, the peel strength of a functional layer, and the cell volume change and low-temperature output characteristics of a lithium ion secondary battery.

<Proportion of Oxide Structure-Containing Monomer Unit in Polymer>

A $^1$H-NMR spectrum and a $^{13}$C-NMR spectrum were measured by nuclear magnetic resonance spectroscopy for a polymer obtained in each example or comparative example using deuterated chloroform as a measurement solvent and tetramethylsilane as a chemical shift standard. The proportion (mol %) in which the polymer included an oxide structure-containing monomer unit was determined from the area ratio of the obtained peaks.

<Number-Average Molecular Weight>

A polymer obtained in each example or comparative example was dissolved in dimethylformamide to produce a 1% solution as a measurement sample. The number-average molecular weight of the polymer was then determined by GPC measurement performed using a solution obtained by dissolving 0.85 g/mL of sodium nitrate in a 10 volume % aqueous solution of dimethylformamide as a developing solvent and polystyrene as a standard.

Note that an HLC-8220GPC (produced by Tosoh Corporation) was used as a GPC measurement apparatus, an HLC-8320GPC RI detector (produced by Tosoh Corporation) was used as a detector, a TSKgelSuperHZM-M (produced by Tosoh Corporation) was used as a measurement column, and measurement was performed under conditions of a measurement temperature of 40° C., a developing solvent flow rate of 0.6 mL/min, and a sample injection volume of 20 μL.

<Glass-Transition Temperature>

A dispersion liquid of a binder or organic particles obtained in each example or comparative example was dried in an environment having a humidity of 50% and a temperature of 23° C. to 25° C. for 3 days to obtain a film of 1±0.3 mm in thickness. This film was dried in a 120° C. hot-air oven for 1 hour. Thereafter, the dried film was used as a sample to measure the glass-transition temperature (° C.) in accordance with JIS K7121 and with a measurement temperature of −100° C. to 180° C. and a heating rate of 5° C./min, using a differential scanning calorimeter (DSC6220 produced by SIT Nanotechnology).

<Volume-Average Particle Diameter D50>

The volume-average particle diameter D50 of a binder or non-conductive particles obtained in each example or comparative example was measured using a laser diffraction/scattering particle size distribution analyzer (LS230 produced by Beckman Coulter Inc.).

<Degree of Swelling in Electrolyte Solution>

A water dispersion of organic particles obtained in each example or comparative example was applied onto copper foil and was dried in a hot-air dryer at 50° C. for 20 minutes and at 120° C. for 20 minutes to produce a 1 cm×1 cm film (thickness: 100 μm). The weight M0 of the film was measured. The obtained film was subsequently immersed in electrolyte solution at 60° C. for 72 hours. Note that the electrolyte solution was a solution obtained by dissolving $LiPF_6$ as a supporting electrolyte with a concentration of 1 M in a mixed solvent of ethylene carbonate (EC), diethyl carbonate (DEC), and vinylene carbonate (VC) (EC/DEC/VC=68.5/30/1.5 (volume ratio)). After immersion, electrolyte solution on the surface of the film was wiped off, and the weight M1 of the film was measured. The degree of swelling in electrolyte solution of the organic particles was calculated by the following formula.

Degree of swelling in electrolyte solution=$M1/M0$

<Peel Strength of Functional Layer>

A laminate of a positive electrode and a separator and a laminate of a negative electrode and a separator that were obtained in each example or comparative example were each cut to a width of 10 mm to obtain test specimens. Each test specimen was immersed in electrolyte solution at a temperature of 60° C. for 3 days. The electrolyte solution had ethylene carbonate/diethyl carbonate/vinylene carbonate (=68.5/30/1.5 (volume ratio)) as a solvent and $LiPF_6$ of 1 M in concentration as an electrolyte. After immersion, the test specimen was removed and electrolyte solution attached to the surface thereof was wiped off. The test specimen was then placed with the surface of the electrode (positive electrode or negative electrode) facing downward, and cellophane tape was affixed to the surface of the electrode. The cellophane tape was secured to a horizontal test stage in advance. Moreover, tape prescribed by JIS Z1522 was used as the cellophane tape. One end of the separator was subsequently pulled vertically upward at a pulling speed of 50 mm/min to peel off the separator, and the stress during peeling was measured. This measurement was performed three times for a laminate including a positive electrode and a separator and three times for a laminate including a negative electrode and a separator (i.e., six times in total). The average value of the stress was determined and was evaluated as follows as the peel strength of a functional layer.

A: Peel strength of 5.0 N/m or more
B: Peel strength of not less than 3.0 N/m and less than 5.0 N/m
C: Peel strength of not less than 0.5 N/m and less than 3.0 N/m
D: Peel strength of less than 0.5 N/m <Cell Volume Change>

A lithium ion secondary battery produced in each example or comparative example was left at rest in a 25° C. environment for 24 hours. Next, the lithium ion secondary battery was subjected to a charge/discharge operation of charging to 4.35 V at a charge rate of 0.1 C and discharging to 2.75 V at a discharge rate of 0.1 C in a 25° C. environment. Thereafter, the battery cell was immersed in liquid paraffin and its volume V0 was measured. The lithium ion secondary battery was then subjected to 1,000 cycles of a charge/discharge operation of charging to 4.35 V at a charge rate of 0.1 C and discharging to 2.75 V at a discharge rate of 0.1 C in a 60° C. environment. After 1,000 cycles of charging and discharging, the battery cell was immersed in liquid paraffin and its volume V1 was measured.

The rate of volume change ΔV of the battery cell between before and after 1,000 cycles of charging and discharging was calculated by ΔV (%)=(V1−V0)/V0×100. This rate of volume change ΔV was evaluated by the following standard. A smaller value for the rate of volume change ΔV indicates that the lithium ion secondary battery has better function in terms of inhibiting volume expansion caused by evolution of gas.

A: Rate of volume change ΔV of less than 20%
B: Rate of volume change ΔV of not less than 20% and less than 30%
C: Rate of volume change ΔV of not less than 30% and less than 40%
D: Rate of volume change ΔV of 40% or more <Low-Temperature Output Characteristics>

A lithium ion secondary battery produced in each example or comparative example was constant current-constant voltage (CCCV) charged to 4.3 V in an atmosphere having a temperature of 25° C. for cell preparation. The prepared cell was discharged to 3.0 V by 0.2 C and 1 C constant current methods in an atmosphere having a temperature of −10° C., and the electric capacity was determined. A discharge capacity maintenance rate expressed by the ratio of the electric capacities (=(electric capacity at 1 C/electric capacity at 0.2 C)×100(%)) was calculated. Note that these measurements were performed for five lithium ion secondary battery cells. The average value of the discharge capacity maintenance rates for these cells was evaluated by the following standard as a low-temperature output characteristic. A larger value indicates better low-temperature output characteristics.

A: Average value for discharge capacity maintenance rate of 90% or more
B: Average value for discharge capacity maintenance rate of not less than 80% and less than 90%
C: Average value for discharge capacity maintenance rate of not less than 70% and less than 80%
D: Average value for discharge capacity maintenance rate of less than 70%

Example 1

<Production of Polymer>

The inside of a glass reactor equipped with a stirrer was purged with nitrogen. Thereafter, 7.1 g of methoxy polyethylene glycol acrylate (Methoxy Polyethylene Glycol #550 Acrylate produced by Shin-Nakamura Chemical Co., Ltd.; $R^1$: ethylene group; n: 13) as an oxide structure-containing monomer, 2.9 g of 2-ethylhexyl acrylate (2-EHA) as another monomer, and 100.0 g of toluene were added into the reactor and were heated to 80° C. Next, 0.1 g of ammonium persulfate was added as a polymerization initiator. The reaction was terminated by cooling to room temperature at the point at which the polymerization conversion rate reached 95%. Toluene was removed from the obtained reaction product by an evaporator to obtain a polymer A. The proportion of an oxide structure-containing monomer unit and the number-average molecular weight were measured for the obtained polymer A. The results are shown in Table 1.

<Production of Binder>

Addition of a mixture of 33 parts of 1,3-butadiene as an aliphatic conjugated diene monomer, 62 parts of styrene as an aromatic vinyl monomer, 4 parts of itaconic acid as a carboxy group-containing monomer, 0.3 parts of tert-dodecyl mercaptan as a chain transfer agent, and 0.3 parts of sodium lauryl sulfate as an emulsifier from a vessel A to a pressure vessel B was initiated and, simultaneously thereto, addition of 1 part of potassium persulfate as a polymerization initiator to the pressure vessel B was initiated to initiate polymerization. Note that a reaction temperature of 75° C. was maintained.

Once 4 hours had passed from the start of polymerization (once 70% of the mixture had been added into the pressure vessel B), 1 part of 2-hydroxyethyl acrylate (acrylic acid-2-hydroxyethyl) as a hydroxy group-containing monomer was added into the pressure vessel B over 1 hour and 30 minutes.

Addition of the total amount of the above-described monomers was completed 5 hours and 30 minutes after the start of polymerization. Heating was subsequently performed to 85° C. and a reaction was carried out for 6 hours.

The reaction was terminated by cooling at the point at which the polymerization conversion rate reached 97% to yield a mixture containing a particulate polymer. The mixture containing the particulate polymer was adjusted to pH 8 through addition of 5% sodium hydroxide aqueous solution. Thereafter, unreacted monomer was removed by thermal-vacuum distillation. Cooling was then performed to obtain a water dispersion (solid content concentration: 40%) containing a particulate polymer of a styrene-butadiene copolymer (SBR) as a binder. The glass-transition temperature and volume-average particle diameter D50 of the obtained binder were measured. The results are shown in Table 1.

<Production of Organic Particles>

An acrylic polymer having a core-shell structure was produced as organic particles.

First, in formation of a core portion, 22 parts of acrylonitrile, 42 parts of styrene, 33 parts of butyl acrylate, 2 parts of methacrylic acid, 1 part of ethylene glycol dimethacrylate, 1 part of sodium dodecylbenzenesulfonate as an emulsifier, 150 parts of deionized water, and 0.5 parts of potassium persulfate as a polymerization initiator were loaded into a 5 MPa pressure vessel equipped with a stirrer, were sufficiently stirred, and were then heated to 60° C. to initiate polymerization. Once the polymerization conversion rate reached 96%, 98 parts of styrene and 2 parts of methacrylic acid were continuously added for shell portion formation, and the temperature was raised to 70° C. to continue polymerization. The reaction was terminated by cooling at the point at which the conversion rate reached 96% to yield a water dispersion containing, as organic particles, an acrylic polymer in which a shell portion partially covered the outer surface of a core portion. The volume-average particle diameter D50, degree of swelling in electrolyte solution, and glass-transition temperature of the obtained organic particles were measured. The results are shown in Table 1.

<Production of Non-Conductive Particle Slurry Composition>

Mixing was performed of 86 parts of alumina (produced by Sumitomo Chemical Co., Ltd.; product name: AKP3000; volume-average particle diameter D50: 0.5 µm) as inorganic particles and 14 parts of organic particles obtained by the operations described above. The proportion constituted by the organic particles among non-conductive particles obtained by combining the inorganic particles (alumina) and the organic particles was 40 volume %. A non-conductive particle slurry composition was then produced by adding 5 parts of the binder, 1.5 parts of polyacrylamide as a thickener, and 0.8 parts of polyacrylic acid as a dispersant to 100 parts of the non-conductive particles obtained by combining the inorganic particles (alumina) and the organic particles, further adding deionized water to adjust the solid content concentration to 15%, and performing mixing using a ball mill.

<Production of Composition for Electrochemical Device Functional Layer>

The non-conductive particle slurry composition and the polymer A were mixed in a stirring vessel such that the additive amount of the polymer A was 10 parts in terms of solid content per 100 parts of the non-conductive particles. The resultant mixture was diluted with deionized water to obtain a composition for an electrochemical device functional layer having a solid content concentration of 10%.

<Production of Separator Equipped with Functional Layer for Electrochemical Device>

The composition for an electrochemical device functional layer was applied onto a separator (made from polypropylene; product name: Celgard 2500) substrate and was dried at 50° C. for 3 minutes. This operation was performed with respect to both sides of the separator substrate so as to obtain a separator including a functional layer for an electrochemical device of 5 µm in thickness at both sides thereof (separator equipped with functional layer for electrochemical device).

<Production of Negative Electrode>

A 5 MPa pressure vessel equipped with a stirrer was charged with 33 parts of 1,3-butadiene, 3.5 parts of itaconic acid (IA), 63.5 parts of styrene (ST), 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was terminated by cooling at the point at which the polymerization conversion rate reached 96% to yield a mixture containing a binder (SBR) for a negative electrode mixed material layer. The mixture containing the binder for a negative electrode mixed material layer was adjusted to pH 8 through addition of 5% sodium hydroxide aqueous solution and was then subjected to thermal-vacuum distillation to remove unreacted monomer. Thereafter, the mixture was cooled to 30° C. or lower to yield a water dispersion containing the desired binder for a negative electrode mixed material layer.

After combining 100 parts of artificial graphite (volume-average particle diameter: 15.6 μm) as a negative electrode active material, 1 part in terms of solid content of a 2% aqueous solution of a sodium salt of carboxymethyl cellulose (MAC350HC produced by Nippon Paper Industries Co., Ltd.) as a viscosity modifier, and deionized water and adjusting these materials to a solid content concentration of 68%, mixing thereof was performed at 25° C. for 60 minutes. The solid content concentration was further adjusted to 62% with deionized water and then mixing was performed at 25° C. for a further 15 minutes. Next, 1.5 parts in terms of solid content of the binder for a negative electrode mixed material layer described above and deionized water were added to the resultant mixture, the final solid content concentration was adjusted to 52%, and a further 10 minutes of mixing was performed. The mixture was then subjected to a defoaming process under reduced pressure to yield a slurry composition for a secondary battery negative electrode having good fluidity.

The obtained slurry composition for a lithium ion secondary battery negative electrode was applied onto copper foil (current collector) of 20 μm in thickness by a comma coater such as to have a thickness of approximately 150 μm after drying. The slurry composition was dried by conveying the copper foil inside a 60° C. oven for 2 minutes at a speed of 0.5 m/min. Thereafter, heat treatment was performed at 120° C. for 2 minutes to obtain a pre-pressing negative electrode web. The pre-pressing negative electrode web was rolled by roll pressing to obtain a post-pressing negative electrode having a negative electrode mixed material layer thickness of 80 μm.

<Production of Positive Electrode>

A slurry composition for a lithium ion secondary battery positive electrode was obtained by combining 100 parts of LiCoO$_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent so as to have a total solid content concentration of 70% and mixing these materials using a planetary mixer.

The obtained slurry composition for a lithium ion secondary battery positive electrode was applied onto aluminum foil (current collector) of 20 μm in thickness by a comma coater such as to have a thickness of approximately 150 μm after drying. The slurry composition was dried by conveying the aluminum foil inside a 60° C. oven for 2 minutes at a speed of 0.5 m/min. Thereafter, heat treatment was performed at 120° C. for 2 minutes to obtain a pre-pressing positive electrode web. The pre-pressing positive electrode web was rolled by a roll press to obtain a post-pressing positive electrode including a positive electrode mixed material layer.

The separator equipped with a functional layer for an electrochemical device, the positive electrode, and the negative electrode obtained by the operations described above were used to produce a laminate including a positive electrode and a separator and a laminate including a negative electrode and a separator in order to evaluate functional layer peel strength. The results are shown in Table 1.

<Production of Lithium Ion Secondary Battery>

A rectangle of 49 cm×5 cm was cut out from the obtained post-pressing positive electrode and was placed with the surface at the positive electrode mixed material layer side thereof on top. A separator that had been cut out to 120 cm×5.5 cm was placed on the positive electrode mixed material layer such that the positive electrode was positioned at the longitudinal direction left-hand side of the separator. In addition, a rectangle of 50 cm×5.2 cm was cut out from the obtained post-pressing negative electrode and was placed on the separator such that the surface at the negative electrode mixed material layer side thereof faced toward the separator and such that the negative electrode was positioned at the longitudinal direction right-hand side of the separator. The resultant laminate was wound by a winding machine to obtain a roll. The roll was enclosed in an aluminum packing case serving as a battery case, electrolyte solution (solvent: ethylene carbonate/diethyl carbonate/vinylene carbonate=68.5/30/1.5 (volume ratio); electrolyte: LiPF$_6$ of 1 M in concentration) was injected such that no air remained, and an opening of the aluminum packing case was closed by heat sealing at 150° C. to produce a wound-type lithium ion secondary battery having a capacity of 800 mAh.

The obtained lithium ion secondary battery was used to evaluate the cell volume change and low-temperature output characteristics. The results are shown in Table 1.

Example 2

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that polypropylene glycol monoacrylate (BLEMMER AP Series AP-800 produced by NOF Corporation; $R^1$: propylene group; n: 13) was used instead of methoxy polyethylene glycol acrylate (Methoxy Polyethylene Glycol #550 Acrylate produced by Shin-Nakamura Chemical Co., Ltd.; $R^1$: ethylene group; n: 13) as an oxide structure-containing monomer in production of the polymer A. The results are shown in Table 1.

Example 3

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 2 and the same evaluations were performed with the exception that acrylonitrile (AN) was used instead of 2-EHA as another monomer in production of the polymer A. The results are shown in Table 1.

Example 4

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that in production of the polymer A, polystyrene glycol monoacrylate ($R^1$: phenylethylene group; n: 13) was used instead of methoxy polyethylene glycol acrylate (Methoxy Polyethylene Glycol #550 Acrylate produced by Shin-Nakamura Chemical Co., Ltd.; $R^1$: ethylene group; n: 13) as an oxide structure-containing monomer, and methacrylic acid (MAA) was used instead of 2-EHA as another monomer. The results are shown in Table 1.

Note that the polystyrene glycol monoacrylate was synthesized in accordance with a method described in JP 5466374 B.

Example 5

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that in production of the polymer A, the additive amount of methoxy polyethylene glycol acrylate (Methoxy Polyethylene Glycol #550 Acrylate produced by Shin-Nakamura Chemical Co., Ltd.; $R^1$: ethylene group; n: 13) as an oxide structure-containing monomer was changed from 7.1 g to 10 g, 2-EHA was not added as another monomer, and the additive amount of ammonium persulfate as a polymerization initiator was changed from 0.1 g to 1.9 g. The results are shown in Table 1.

Examples 6 to 9

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that in production of the polymer A, the additive amount of methoxy polyethylene glycol acrylate (Methoxy Polyethylene Glycol #550 Acrylate produced by Shin-Nakamura Chemical Co., Ltd.; $R^1$: ethylene group; n: 13) was changed from 7.1 g to 4.72 g (Example 6), 5.44 g (Example 7), 8.43 g (Example 8), or 9.35 g (Example 9), the additive amount of 2-EHA was changed from 2.9 g to 5.28 g (Example 6), 4.56 g (Example 7), 1.57 g (Example 8), or 0.65 g (Example 9), and the additive amount of ammonium persulfate as a polymerization initiator was changed from 0.1 g to 0.08 g (Example 6), 0.09 g (Example 7), 0.15 g (Example 8), or 0.17 g (Example 9). The results are shown in Table 1.

Example 10

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that polyethylene glycol monoacrylate (BLEMMER AE Series AE-90 produced by NOF Corporation; $R^1$: ethylene group; n: 2) was used instead of methoxy polyethylene glycol acrylate (Methoxy Polyethylene Glycol #550 Acrylate produced by Shin-Nakamura Chemical Co., Ltd.; $R^1$: ethylene group; n: 13) as an oxide structure-containing monomer in production of the polymer A. The results are shown in Table 1.

Example 11

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that Methoxy Polyethylene Glycol #1000 Methacrylate (produced by Shin-Nakamura Chemical Co., Ltd.; $R^1$: ethylene group; n: 23) was used instead of methoxy polyethylene glycol acrylate (Methoxy Polyethylene Glycol #550 Acrylate produced by Shin-Nakamura Chemical Co., Ltd.; $R^1$: ethylene group; n: 13) as an oxide structure-containing monomer in production of the polymer A. The results are shown in Table 1.

Examples 12 and 13

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that in production of the polymer A, the polymerization temperature was changed from 80° C. to 70° C. in Example 12, and the additive amount of ammonium persulfate as a polymerization initiator was changed from 0.1 g to 0.11 g in Example 13. The results are shown in Table 1.

Example 14

In production of a binder, a reactor including a stirrer was charged with 70 parts of deionized water, 0.15 parts of sodium lauryl sulfate (produced by Kao Corporation; product name: EMAL 2F) as an emulsifier, and 0.5 parts of ammonium persulfate. The gas phase of the reactor was purged with nitrogen gas and the temperature was raised to 60° C. Meanwhile, a monomer mixture was obtained in a separate vessel by mixing 50 parts of deionized water, 0.7 parts of sodium dodecylbenzenesulfonate as a dispersant, and 77.8 parts of 2-ethylhexyl acrylate (2-EHA), 20 parts of acrylonitrile (AN), 2 parts of methacrylic acid (MAA), and 0.2 parts of allyl methacrylate (AMA) as polymerizable monomers. This monomer mixture was added continuously into the reactor over 4 hours to carry out polymerization. The reaction was carried out at 60° C. during the addition. Once the addition was completed, further stirring was carried out at 70° C. for 3 hours to complete the reaction and yield a water dispersion containing an acrylic binder as a binder.

A polymer A, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that the acrylic binder described above was used instead of SBR as a binder. The results are shown in Table 1.

Example 15

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that in production of the non-conductive particle slurry composition, the additive amount of inorganic particles (alumina) was changed from 86 parts to 0 parts, and the additive amount of organic particles was changed from 14 parts to 100 parts. The results are shown in Table 1.

Example 16

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that a polyvinylidene fluoride-hexafluoropropylene copolymer (PVdF-HFP; produced by Sigma-Aldrich Corporation) was used instead of the acrylic polymer produced in Example 1 as organic particles, and acetone was used instead of water as a solvent in the composition for an electrochemical device functional layer. The results are shown in Table 1.

Example 17

A polymer A, a binder, a non-conductive particle slurry composition, a composition for an electrochemical device functional layer, a negative electrode, and a positive electrode were produced in the same way as in Example 1 with the exception that the production methods of the non-conductive particle slurry composition and the composition for an electrochemical device functional layer were changed such that, in the composition for an electrochemical device functional layer, the additive amount of the polymer A was 100 parts, the additive amount of the binder was 5 parts, the additive amount of organic particles was 0 parts, and the additive amount of inorganic particles was 0 parts, and acetone was used instead of water as a solvent in production of the polymer A, the binder, the non-conductive particle slurry composition, and the composition for an electrochemical device functional layer. The composition for an electrochemical device functional layer was applied onto the surface of a negative electrode mixed material layer of the obtained negative electrode and was dried at 50° C. for 3 minutes to obtain a negative electrode including a functional layer for an electrochemical device of 0.1 µm in thickness at one side of the negative electrode (negative electrode equipped with functional layer for electrochemical device). A lithium ion secondary battery was produced in the same way as in Example 1 and the same evaluations were performed with the exception that this negative electrode equipped with a functional layer for an electrochemical device was used and a separator that did not include a functional layer for an electrochemical device was used. The results are shown in Table 1.

Example 18

A polymer A, a non-conductive particle slurry composition, a composition for an electrochemical device functional layer, a negative electrode, and a positive electrode were produced in the same way as in Example 17 with the exception that PVdF (produced by Kureha Corporation; product name: #7208) was used as a binder. The composition for an electrochemical device functional layer was applied onto the surface of a positive electrode mixed material layer of the obtained positive electrode and was dried at 50° C. for 3 minutes to obtain a positive electrode including a functional layer for an electrochemical device of 0.1 µm in thickness at one side of the positive electrode (positive electrode equipped with functional layer for electrochemical device). A lithium ion secondary battery was produced in the same way as in Example 1 and the same evaluations were performed with the exception that this positive electrode equipped with a functional layer for an electrochemical device was used and a separator that did not include a functional layer for an electrochemical device was used. The results are shown in Table 1.

Comparative Example 1

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that in production of the polymer A, methoxy polyethylene glycol monomethacrylate (BLEMMER PME Series PME-200 produced by NOF Corporation; $R^1$: ethylene group; n: 4) and polypropylene glycol monoacrylate (BLEMMER AP Series AP-550 produced by NOF Corporation; $R^1$: propylene group; n: 9) were used instead of methoxy polyethylene glycol acrylate (Methoxy Polyethylene Glycol #550 Acrylate produced by Shin-Nakamura Chemical Co., Ltd.; $R^1$: ethylene group; n: 13) as oxide structure-containing monomers, and MAA was used instead of 2-EHA as another monomer. The results are shown in Table 1.

Comparative Example 2

A polymer A, a binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that methyl methacrylate (MMA) was used instead of 2-EHA as another monomer in production of the polymer A. The results are shown in Table 1.

Comparative Example 3

A binder, organic particles, a non-conductive particle slurry composition, a composition for an electrochemical device functional layer, a separator equipped with a functional layer for an electrochemical device, a negative electrode, a positive electrode, and a lithium ion secondary battery were produced in the same way as in Example 1 and the same evaluations were performed with the exception that

TABLE 1

| | | | | Example 1 | Example 2 | Example 3 | Example 4 | Example 5 | Example 6 | Example 7 | Example 8 |
|---|---|---|---|---|---|---|---|---|---|---|---|
| Composition for electrochemical device functional layer | Polymer A | Chemical composition | Oxide structure-containing monomer unit | $R^1$ | Ethylene group | Propylene group | Propylene group | Phenyl ethylene group | Ethylene group | Ethylene group | Ethylene group | Ethylene group |
| | | | | No. of repetitions (n) of oxide structure | 13 | 13 | 13 | 13 | 13 | 13 | 13 | 13 |
| | | | | Proportion of oxide structure-containing monomer unit (mol %) | 40 | 40 | 40 | 40 | 100 | 20 | 25 | 60 |
| | | | Other monomer unit | Type | 2-EHA | 2-EHA | AN | MAA | — | 2-EHA | 2-EHA | 2-EHA |
| | | | | Proportion of other monomer unit (mol %) | 60 | 60 | 60 | 60 | — | 80 | 75 | 40 |
| | | Physical properties | Number-average molecular weight | | 6400 | 8500 | 9200 | 10800 | 6800 | 6600 | 7000 | 6200 |
| | | Additive amount (parts by mass) | | | 10 | 10 | 10 | 10 | 10 | 10 | 10 | 10 |
| | Binder | Type | | | SBR | SBR | SBR | SBR | SBR | SBR | SBR | SBR |
| | | Physical properties | Glass-transition temperature (° C.) | | 0 | 0 | 0 | 0 | 0 | 0 | 0 | 0 |
| | | | Volume-average particle diameter D50 (μm) | | 0.18 | 0.18 | 0.18 | 0.18 | 0.18 | 0.18 | 0.18 | 0.18 |
| | | Additive amount (parts by mass) | | | 5 | 5 | 5 | 5 | 5 | 5 | 5 | 5 |
| | Solvent | | | | Water | Water | Water | Water | Water | Water | Water | Water |
| | Non-conductive particles | Inorganic particles | Type | | Alumina | Alumina | Alumina | Alumina | Alumina | Alumina | Alumina | Alumina |
| | | | Physical properties | Volume-average particle diameter D50 (μm) | 0.5 | 0.5 | 0.5 | 0.5 | 0.5 | 0.5 | 0.5 | 0.5 |
| | | | Additive amount (parts by mass) | | 86 | 86 | 86 | 86 | 86 | 86 | 86 | 86 |
| | | Organic particles | Type | | Acrylic polymer | Acrylic polymer | Acrylic polymer | Acrylic polymer | Acrylic polymer | Acrylic polymer | Acrylic polymer | Acrylic polymer |
| | | | Physical properties | Volume-average particle diameter D50 (μm) | 0.45 | 0.45 | 0.45 | 0.45 | 0.45 | 0.45 | 0.45 | 0.45 |
| | | | | Degree of swelling | 4 | 4 | 4 | 4 | 4 | 4 | 4 | 4 |
| | | | | Glass-transition temperature (° C.) | 64 | 64 | 64 | 64 | 64 | 64 | 64 | 64 |
| | | | Additive amount (parts by mass) | | 14 | 14 | 14 | 14 | 14 | 14 | 14 | 14 |
| | | | Proportion constituted by organic particles among non-conductive particles (vol %) | | 40 | 40 | 40 | 40 | 40 | 40 | 40 | 40 |
| | | Additive amount of non-conductive particles in terms of solid content (mass %) | | | 85 | 85 | 85 | 85 | 85 | 85 | 85 | 85 |
| Functional layer for electrochemical device | Functional layer formation location | | | | Separator | Separator | Separator | Separator | Separator | Separator | Separator | Separator |
| | Functional layer thickness (μm) | | | | 5 | 5 | 5 | 5 | 5 | 5 | 5 | 5 |
| Cell volume change | | | | | A | A | A | A | B | A | A | A |
| Peel strength | | | | | A | A | A | A | A | B | B | A |
| Low-temperature output characteristics | | | | | A | B | B | B | A | B | B | A |

TABLE 1-continued

| | | | | Example 9 | Example 10 | Example 11 | Example 12 | Example 13 | Example 14 | Example 15 |
|---|---|---|---|---|---|---|---|---|---|---|
| Composition for electrochemical device functional layer | Polymer A | Chemical composition | Oxide structure-containing monomer unit | | | | | | | |
| | | | $R^1$ | Ethylene group | Ethylene group | Ethylene group | Ethylene group | Ethylene group | Ethylene group | Ethylene group |
| | | | No. of repetitions (n) of oxide structure | 13 | 2 | 23 | 13 | 13 | 13 | 13 |
| | | | Proportion of oxide structure-containing monomer unit (mol %) | 80 | 40 | 40 | 40 | 40 | 40 | 40 |
| | | | Other monomer unit Type | 2-EHA | 2-EHA | 2-EHA | 2-EHA | 2-EHA | 2-EHA | 2-EHA |
| | | | Proportion of other monomer unit (mol %) | 20 | 60 | 60 | 60 | 60 | 60 | 60 |
| | | Physical properties | Number-average molecular weight | 6400 | 7900 | 8000 | 14200 | 5400 | 6400 | 6400 |
| | | Additive amount (parts by mass) | | 10 | 10 | 10 | 10 | 10 | 10 | 10 |
| | Binder | Type | | SBR | SBR | SBR | SBR | SBR | Acrylic binder | SBR |
| | | Physical properties | Glass-transition temperature (° C.) | 0 | 0 | 0 | 0 | 0 | −16 | 0 |
| | | | Volume-average particle diameter D50 (μm) | 0.18 | 0.18 | 0.18 | 0.18 | 0.18 | 0.19 | 0.18 |
| | | Additive amount (parts by mass) | | 5 | 5 | 5 | 5 | 5 | 5 | 5 |
| | Solvent | | | Water | Water | Water | Water | Water | Water | Water |
| | Non-conductive particles | Inorganic particles | Type | Alumina | Alumina | Alumina | Alumina | Alumina | Alumina | — |
| | | Physical properties | Volume-average particle diameter D50 (μm) | 0.5 | 0.5 | 0.5 | 0.5 | 0.5 | 0.5 | — |
| | | Additive amount (parts by mass) | | 86 | 86 | 86 | 86 | 86 | 86 | 0 |
| | | Organic particles | Type | Acrylic polymer | Acrylic polymer | Acrylic polymer | Acrylic polymer | Acrylic polymer | Acrylic polymer | Acrylic polymer |
| | | Physical properties | Volume-average particle diameter D50 (μm) | 0.45 | 0.45 | 0.45 | 0.45 | 0.45 | 0.45 | 0.45 |
| | | | Degree of swelling | 4 | 4 | 4 | 4 | 4 | 4 | 4 |
| | | | Glass-transition temperature (° C.) | 64 | 64 | 64 | 64 | 64 | 64 | 64 |
| | | Additive amount (parts by mass) | | 14 | 14 | 14 | 14 | 14 | 14 | 100 |
| | | Proportion constituted by organic particles among non-conductive particles (vol %) | | 40 | 40 | 40 | 40 | 40 | 40 | 100 |
| | | Additive amount of non-conductive particles in terms of solid content (mass %) | | 85 | 85 | 85 | 85 | 85 | 85 | 85 |
| Functional layer for electrochemical device | Functional layer formation location | | | Separator | Separator | Separator | Separator | Separator | Separator | Separator |
| | Functional layer thickness (μm) | | | 5 | 5 | 5 | 5 | 5 | 5 | 5 |
| Cell volume change | | | | A | A | B | B | A | A | A |
| Peel strength | | | | A | B | A | A | B | A | A |
| Low-temperature output characteristics | | | | A | A | A | A | B | A | A |

TABLE 1-continued

| | | | | Example 16 | Example 17 | Example 18 | Comparative Example 1 | Comparative Example 2 | Comparative Example 3 |
|---|---|---|---|---|---|---|---|---|---|
| Composition for electrochemical device functional layer | Polymer A | Chemical composition | Oxide structure-containing monomer unit | $R^1$ | Ethylene group | Ethylene group | Ethylene group | Ethylene group/ Propylene group | Ethylene group | — |
| | | | | No. of repetitions (n) of oxide structure | 13 | 13 | 13 | Ethylene oxide structure: 4/Propylene oxide structure: 9 | 13 | — |
| | | | | Proportion of oxide structure-containing monomer unit (mol %) | 40 | 40 | 40 | 40 | 40 | 0 |
| | | | Other monomer unit | Type | 2-EHA | 2-EHA | 2-EHA | MAA | MMA | PVA |
| | | | | Proportion of other monomer unit (mol %) | 60 | 60 | 60 | 60 | 60 | 100 |
| | | Physical properties | Number-average molecular weight | | 6400 | 6400 | 6400 | 18000 | 3200 | 10000 |
| | | Additive amount (parts by mass) | | | 10 | 100 | 100 | 3 | 3 | 5 |
| | Binder | Type | | | SBR | SBR | PVdF | SBR | SBR | SBR |
| | | Physical properties | Glass-transition temperature (° C.) | | 0 | 0 | −40 | 0 | 0 | 0 |
| | | | Volume-average particle diameter D50 (μm) | | 0.18 | 0.18 | 0.2 | 0.18 | 0.18 | 0.18 |
| | | Additive amount (parts by mass) | | | 5 | 5 | 5 | 5 | 5 | 5 |
| | Solvent | | | | Acetone | Acetone | Acetone | Water | Water | Water |
| | Non-conductive particles | Inorganic particles | Type | | Alumina | — | — | Alumina | Alumina | Alumina |
| | | | Physical properties | Volume-average particle diameter D50 (μm) | 0.5 | — | — | 0.5 | 0.5 | 0.5 |
| | | | Additive amount (parts by mass) | | 86 | 0 | 0 | 86 | 86 | 86 |
| | | Organic particles | Type | | PVdF-HFP | — | — | Acrylic polymer | Acrylic polymer | Acrylic polymer |
| | | | Physical properties | Volume-average particle diameter D50 (μm) | 0.30 | — | — | 0.45 | 0.45 | 0.45 |
| | | | | Degree of swelling | 2 | — | — | 4 | 4 | 4 |
| | | | | Glass-transition temperature (° C.) | −40 | — | — | 64 | 64 | 64 |
| | | | Additive amount (parts by mass) | | 14 | 0 | 0 | 14 | 14 | 14 |
| | | | Proportion constituted by organic particles among non-conductive particles (vol %) | | 40 | — | — | 40 | 40 | 40 |
| | | Additive amount of non-conductive particles in terms of solid content (mass %) | | | 85 | 0 | 0 | 85 | 85 | 85 |
| Functional layer for electrochemical device | Functional layer formation location | | | | Separator | Negative electrode | Positive electrode | Separator | Separator | Separator |
| | Functional layer thickness (μm) | | | | 5 | 0.1 | 0.1 | 5 | 5 | 5 |
| Cell volume change | | | | | A | A | A | D | C | D |
| Peel strength | | | | | A | B | B | C | D | C |
| Low-temperature output characteristics | | | | | B | B | B | B | B | D |

It can be seen from Table 1 that in Examples 1 to 18 in which the used composition for an electrochemical device functional layer contained a solvent and a polymer A including a specific oxide structure-containing monomer unit and having a number-average molecular weight within a specific numerical range, volume expansion of the obtained lithium ion secondary battery was favorably inhibited. Also note that the functional layer for an electrochemical device formed using the composition for an electrochemical device functional layer had excellent peel strength.

On the other hand, it can be seen that a lithium ion secondary battery having significantly poorer function in terms of inhibiting volume expansion was obtained in Comparative Example 1 in which the number-average molecular weight of the polymer A exceeded the specific numerical range. It can also be seen that the functional layer for an electrochemical device in Comparative Example 1 had poor peel strength.

Moreover, it can be seen that the functional layer for an electrochemical device had significantly poorer peel strength in Comparative Example 2 in which the number-average molecular weight of the polymer A fell below the specific numerical range. It can also be seen that the lithium ion secondary battery of Comparative Example 2 had poorer function in terms of inhibiting volume expansion.

Furthermore, it can be seen that a lithium ion secondary battery having significantly poorer function in terms of inhibiting volume expansion was obtained in Comparative Example 3 in which a polymer A that did not include a specific oxide structure-containing monomer unit was used.

INDUSTRIAL APPLICABILITY

According to the present disclosure, it is possible to provide a composition for an electrochemical device functional layer that is capable of providing an electrochemical device having low volume expansion.

Moreover, according to the present disclosure, it is possible to provide a functional layer for an electrochemical device that is capable of providing an electrochemical device having low volume expansion, and also to provide an electrochemical device that includes this functional layer for an electrochemical device and has low volume expansion.

The invention claimed is:

1. A functional layer for an electrochemical device comprising: a polymer including an oxide structure-containing monomer unit, wherein
the functional layer does not include electrode active materials,
the functional layer further includes a binder,
the binder is at least one selected from a group consisting of a fluoropolymer, an aliphatic conjugated diene/aromatic vinyl copolymer, a hydrogenated product of an aliphatic conjugated diene/aromatic vinyl copolymer, an aliphatic conjugated diene/acrylonitrile copolymer, a hydrogenated product of an aliphatic conjugated diene/acrylonitrile copolymer, and a polyvinyl alcohol polymer,
the fluoropolymer is polyvinylidene fluoride,
the oxide structure-containing monomer unit has a structure indicated by a formula (I), shown below,

where, in the formula (I), $R^1$ represents an alkylene group or a substituted alkylene group and n is a positive integer,
the polymer further includes a monomer unit X other than the oxide structure-containing monomer unit,
the monomer unit X includes at least one of a (meth)acrylic acid alkyl ester monomer unit and a (meth)acrylonitrile unit,
the monomer unit X does not include a carboxy group-containing monomer unit, and
the polymer has a number-average molecular weight of not less than 5,000 and not more than 15,000.

2. The functional layer for an electrochemical device according to claim 1, wherein $R^1$ is one selected from the group consisting of an ethylene group, a propylene group, and a phenylethylene group.

3. The functional layer for an electrochemical device according to claim 1, wherein n is an integer of not less than 2 and not more than 30.

4. The functional layer for an electrochemical device according to claim 1, wherein the polymer includes the oxide structure-containing monomer unit in a proportion of not less than 20 mol % and not more than 80 mol %.

5. The functional layer for an electrochemical device according to claim 1, further comprising non-conductive particles.

6. The functional layer for an electrochemical device according to claim 1, wherein the non-conductive particles include either or both of inorganic particles and organic particles.

7. An electrochemical device comprising the functional layer according to claim 1.

* * * * *